(12) United States Patent
Evans (10) Patent No.: US 6,229,642 B1
(45) Date of Patent: May 8, 2001

(54) DISTRIBUTED FIBER AMPLIFIER FOR SOLITONS

(75) Inventor: Alan Frank Evans, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/063,815

(22) Filed: Apr. 21, 1998

(51) Int. Cl.[7] .............................. H01S 3/00; H04B 10/00
(52) U.S. Cl. ..................... 359/341; 359/134; 359/160
(58) Field of Search .................... 359/134, 160, 359/341, 173, 179, 188, 127

(56) References Cited

U.S. PATENT DOCUMENTS

| | | | |
|---|---|---|---|
| 5,035,481 | * 7/1991 | Mollenauer | 359/188 |
| 5,530,585 | * 6/1996 | Reid et al. | 359/341 |
| 5,748,824 | 5/1998 | Smith | 385/124 |
| 5,767,998 | * 6/1998 | Hasegawa et al. | 359/161 |

OTHER PUBLICATIONS

Simpson et al., "Performance of a Distributed Erbium–Doped Dispersion–Shifted Fiber Amplifier", Journal of Lightwave Technology, Feb. 1991, vol. 9, No. 2, pp. 228 and 231.

Wada et al., "Loss–Compensation Characteristics and Noise Performance of Distributed Erbium–Doped Optical Fibers", Electronics and Communications in Japan, 1993, Part 1, vol. 75–B1, No. 3, pp. 75.

Nakazawa et al., "Long–distance dynamic soliton transmission technology", NTT R & D(1993) vol. 42, No. 5, pp. 661–668*

* cited by examiner

*Primary Examiner*—Kinfe-Michael Negash
(74) *Attorney, Agent, or Firm*—William J. Chervenak (57) ABSTRACT

A distributed optical amplifier for use with soliton transmission, which reduces the effects of soliton—soliton interaction by introducing an optimum excursion in the soliton intensity. A optimum operating regime is found wherein both the pulse intensity oscillations and the soliton—soliton interactions are taken into account.

12 Claims, 7 Drawing Sheets

DISTRIBUTED FIBER AMPLIFIER FOR SOLITONS

BACKGROUND OF THE INVENTION

The invention is directed to a distributed optical fiber amplifier designed for soliton signal transmission. More particularly, the distributed optical amplifier is optimized to balance self phase modulation and linear dispersion as well as to minimize the effects of soliton—soliton interactions at very high bit rates over long, unregenerated distances.

A soliton is a light pulse which does not change in either the time or spectral wavelength domain when propagated in an ideal optical waveguide fiber. By ideal waveguide is meant, the waveguide is lossless and has a total dispersion, also termed, group velocity dispersion, which, together with the self phase modulation of the soliton, serves to maintain the invariance of a soliton. The non-linear self phase modulation is dependent upon the soliton intensity. Hence, a soliton is invariant only when its intensity is at the level required to balance total waveguide dispersion and self phase modulation. The soliton can still be capable of carrying information when the intensity level is different from that required for invariance, if the travel distance in the optical waveguide is not too great.

The introduction of optical amplifiers into telecommunications systems has made soliton data transmission practical. In the case of localized or lumped optical amplifiers, i.e., those where, for example, an erbium doped waveguide fiber is less than a few tens of meters in length, the spacing between amplifiers must be less than the soliton period. The soliton period is given by the relation, $z_o = 9.53 \times 10^{-5} \times T^2 / S^2 D$, where $Z_o$ is the soliton period, T the soliton pulse width in ps, S the soliton wavelength in nm, and D the total dispersion in ps/nm-km. It is clear from the form of this relation, that the soliton period decreases with decreasing soliton pulse width. Thus, for systems requiring high data rates, which implies small soliton widths, the spacing of optical amplifiers becomes shorter. At 40 Gbps, the optical amplifier spacing must be less than 10 km, thereby placing a severe initial cost and maintenance burden on the system.

A potential solution to this spacing problem is provided by the distributed optical amplifier, wherein the dopant, e.g., erbium, is distributed along essentially the entire length of the waveguide fiber. By coupling a pre-selected pump light energy into the waveguide at appropriate length intervals, the waveguide fiber can be made lossless on a local basis so that the soliton intensity does not vary appreciably with length.

To achieve this condition of transmission of essentially invariant solitons using a distributed optical amplifier:

- the attenuation of the pump signal in the waveguide must be taken into account;
- the concentration of erbium along the waveguide fiber must be chosen high enough to provide for lossless transmission and reasonable pump light efficiency;
- the concentration of erbium along the waveguide fiber must be low enough to keep the local gain low to provide for small excursions of soliton intensity.

The concept of distributed optical amplifiers is discussed in, "Performance of a Distributed Erbium-Doped Dispersion-Shifted Fiber Amplifier", Simpson et al., Journal of Lightwave Technology, Vol. 9., No. 2, February 1991, and in "Loss-Compensation Characteristics and Noise Performance of Distributed Erbium-Doped Optical Fibers", Wada et al., Electronics and Communications in Japan, Part 1, Vol. 75-B-I, Nov. 3, 1993. In each of these publications the necessity of keeping soliton energy deviations small is stressed. See Simpson et al., page 228, 2nd col., 2nd paragraph, "Future ultra-high bit rate systems will require . . . a transparent transmission line with only small excursions in the signal amplitude.", and, page 231, Summary, "Continued efforts to fabricate lower erbium concentration, lower loss fiber will . . . improve the performance of these distributed optical amplifiers". See Wada et al., page 75, 2nd col., 1st paragraph, "Especially in N=1 soliton propagation, to preserve the pulse shape along the propagation distance, it is necessary to keep the pulse-energy deviations below about 20%; and therefore optical signal transmission with small-level variations is required." Wada et al., further state the benefit of using bi-directional pumping to provide for longest compensated length (see Summary, page 75, 1st and 2nd paragraph).

In contrast to these publications, the present invention teaches different limits on soliton signal variation for systems of an intermediate length, for example, those case considered below in which the length is in the range of 50 km to 500 km. In addition, for these systems, the teaching of the invention contrasts with the literature with regard to the benefit of bi-directional pumping as compared to uni-directional pumping. This counter teaching stems from a careful evaluation of soliton—soliton interactions, over the intermediate system lengths, which can produce timing jitter of the soliton pulses and soliton collisions, i.e., collapse of two adjacent solitons into a single pulse.

SUMMARY OF THE INVENTION

A first aspect of the invention is a distributed erbium doped optical amplifier which increases the distance between electronic signal regenerators by providing for a soliton pulse power excursion in the range of about +3.0 dB to +5.2 dB. The soliton power excursion is measured relative to a reference soliton power, commonly referred to as the fundamental soliton power of order 1, whereat the self phase modulation is balanced with the total dispersion, D, as defined above. The system operating wavelength, S, is in the so called anomalous region where $S > S_o$, the zero dispersion wavelength. The distributed amplifier fiber has a net positive total dispersion, D. The total dispersion, D, may have negative excursions over lengths small compared to soliton period $z_o$, providing the net total dispersion, D, is positive. Examples of optical waveguide fiber having a core refractive index profile which yields a positive dispersion, D, are disclosed in U.S. patent application Ser. No. 08/559,954. Pump light is coupled to the fiber amplifier to excite the erbium atoms to an energy state which provides for amplification of the signal power. The erbium is confined to the core region of the fiber.

An embodiment of this first aspect is one in which the erbium is doped substantially uniformly along the waveguide fiber core and has a concentration in the range of about 20 ppb to 200 ppb, depending upon the separation of locations at which pump light is coupled into the waveguide.

The distributed amplifier waveguide fiber is doped and pumped to provide for optical transparency of the fiber over its length. That is, the soliton power at the input of the distributed optical amplifier is essentially equal to the soliton power at the output end of the amplifier fiber.

In a preferred embodiment of the invention, which contrasts with the teaching of the publications cited above, the distributed optical amplifier is pumped in only one direction. The pump light may propagate in the same or opposite direction relative to the soliton signals.

A second aspect of the invention is a telecommunication system incorporating the novel distributed optical amplifier. In the telecommunications system, the pumping means are spaced apart by a waveguide fiber length over which the distributed amplifier provides sufficient amplification of the soliton signal to achieve optical transparency of the length.

A preferred embodiment includes uni-directional pumping in the same or different direction as compared to the signal. Stated differently, the pump light may be propagated countercurrent or concurrent with the signal light in the amplifying fiber.

For the types and characteristics of pump lasers available, pumping means may be spaced apart by about 20 km to 90 km.

A typical soliton communications system requires the soliton pulses to be separated in time by at least 5 times the soliton period. In the present invention, soliton spacing may be less than this customary amount. Thus, in another embodiment, the separation in time of the soliton pulses is no greater than about 5 times the soliton pulse width. This time spacing requirement is sufficient to limit the soliton—soliton interactions or collisions to provide for very high data rate transmission. For example, for data rates of 200 Gbps, a soliton pulse width of 1 ps and a pulse spacing no greater than about 5 ps is satisfactory. Such a system configuration, having pumping means spaced apart by about 50 km, is believed to have bit error rate ceiling of about $10^{-9}$, over a system about 500 km in length.

The novel amplifier employed in a telecommunication system provides for long distances between error producing soliton—soliton interactions. In particular, the distance traversed by the 1 ps solitons before a collision or collapse occurs is in the range of at least about 30 km to 50 km and can be as large as 300 km to 400 km.

DETAILED DESCRIPTION OF THE INVENTION

At very high data rates transmitted over long unregenerated distances, unusual strategies must be developed to achieve practical signal to noise ratio, and account for total waveguide dispersion, D, and non-linear effects. The use of solitons as informnation carriers is one such strategy. Soliton signaling is attractive because in the formation and maintenance of the soliton pulse, two dispersive effects are cancelled against each other. That is, total waveguide dispersion, D, and the non-linear, pulse intensity dependent, self phase modulation act together to form and maintain the shape of the soliton.

Because the magnitude of self phase modulation is dependent upon pulse intensity, a major consideration in maintaining soliton integrity is control of soliton intensity as it travels along a waveguide fiber. It is this consideration, discussed above, that has led to the study of distributed optical amplifiers for use in conjunction with soliton transmission. For very high data rate transmission, above about 40 Gbps, establishing waveguide transparency, i.e., ensuring that input power is equal to output power over a selected distance, is not sufficient to maintain soliton integrity. What is required is a waveguide which has local attenuation equal to zero and thus optical transparency over essentially any length.

In addition, another mechanism, soliton—soliton interaction, must also be managed in the high data rate soliton telecommunication system. A soliton travelling in an optical waveguide fiber exerts an attractive or repulsive force, depending upon relative phase, on neighboring solitons. When the spacing between adjacent solitons becomes small enough, the mutual attraction can produce timing jitter in the solitons. Because the force between solitons exponentially increases with decreasing distance, at smaller spacings, soliton pairs coalesce or collapse into a single high intensity pulse. Mutual attraction or repulsion, is, therefore, a source of bit errors in a telecommunication system, particularly those having a close pulse spacing such as is encountered in high data rate systems.

What has been discovered in the present invention is that the susceptibility of solitons to perturb one another or collapse into one another can be lessened by introducing a pre-selected excursion of soliton intensity. Such an intensity excursion can be introduced through use of a distributed optical amplifier having a selected concentration of dopant together with a pump source of selected intensity. In particular, the dopant concentration, which is erbium expressed as ppb $Er^{+3}$ for operation around 1550 nm, and the pump power are combined to produce an intensity excursion of about 3.0 dB to 5.2 dB, relative to a reference power level, while maintaining optical transparency from end to end of the distributed amplifier fiber. The reference power may be taken as that which provides a balance between total dispersion, D, (group velocity dispersion) and self phase modulation. For the systems of up to about 500 km discussed herein, this concept contrasts with the teaching in the art that soliton integrity, as an information carrier, is best maintained by carefully limiting intensity excursions, thereby keeping constant the self phase modulation.

Figure 1:
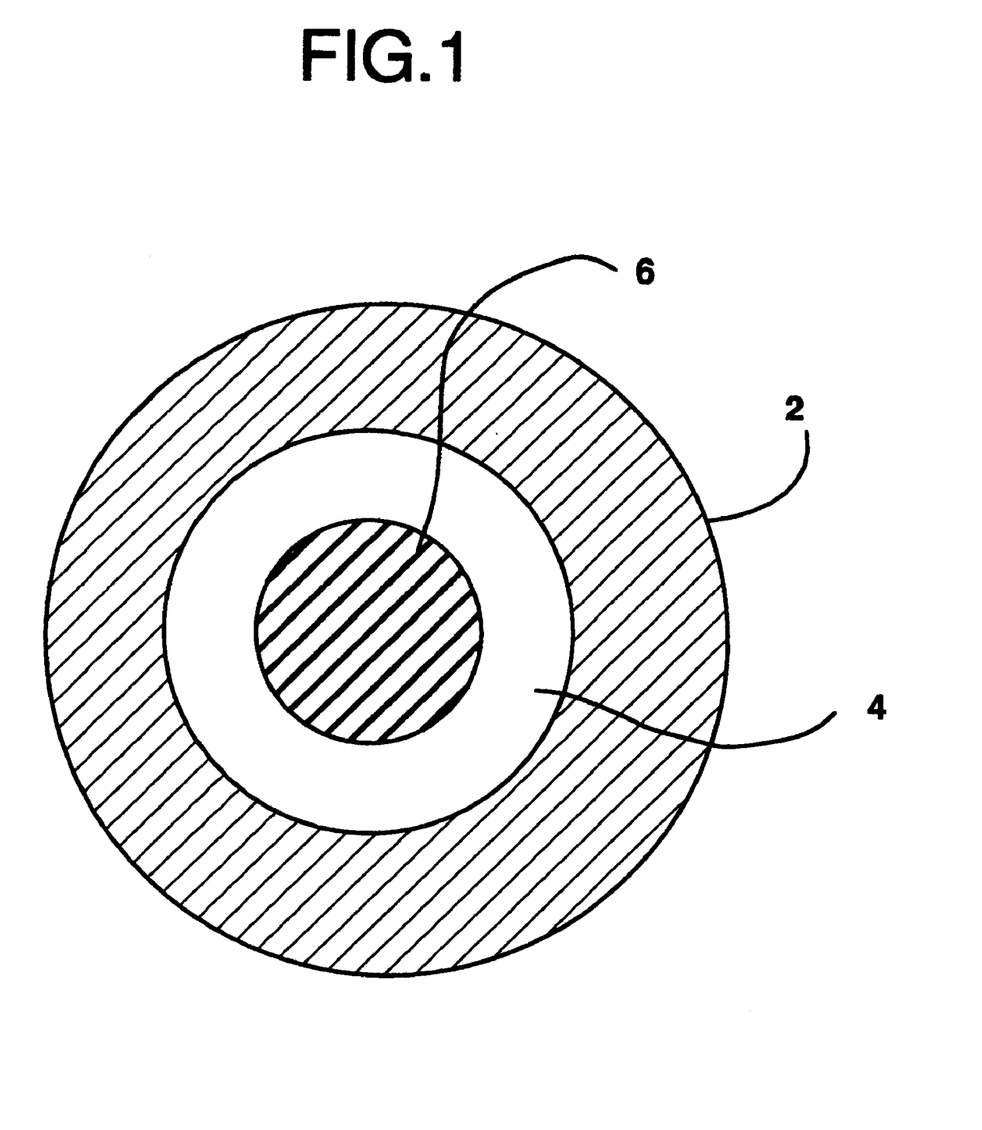
FIG. 1 is a schematic cross section of an erbium doped waveguide fiber.

A cross section of a distributed optical amplifier waveguide fiber is illustrated in FIG. 1. Core region 4 contains the erbium or other dopant shown as region 6 within the core. Region 6 is usually smaller in diameter than the core 4 to increase the collision cross section between signal light and dopant atoms. Clad layer 2 has a refractive index lower than at least a portion of core region 4 to guide the light along the fiber.

Figure 2A:
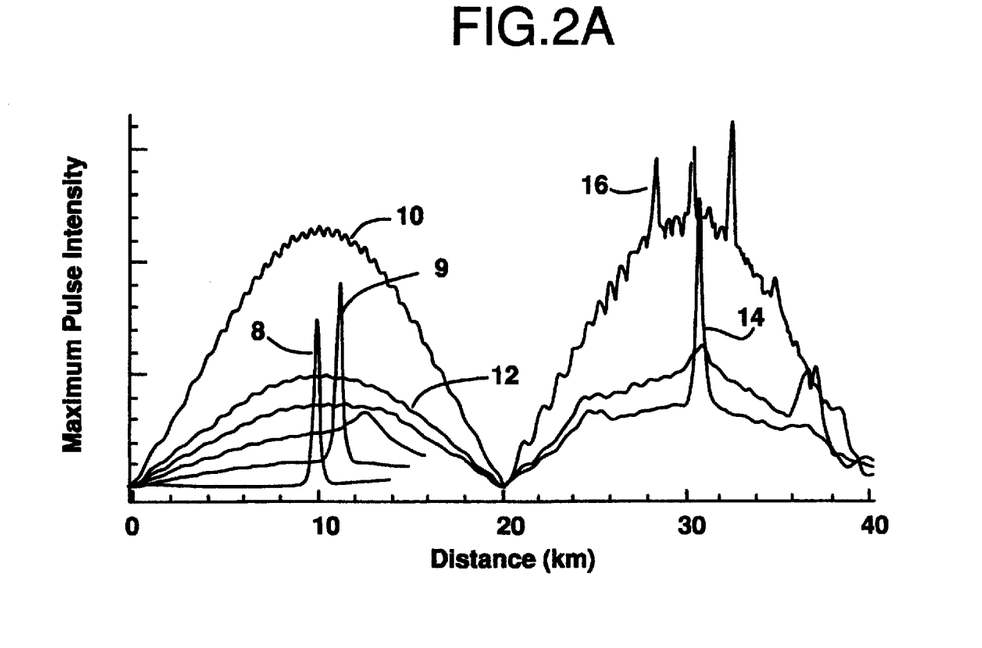
FIG. 2a is a chart of soliton maximum pulse intensity vs. distance for uni-directional pumping.

A model simulation of propagating solitons which undergo an intensity excursion is shown in FIG. 2a. Each curve shown is a chart of soliton maximum intensity vs. travel distance in the distributed amplifier waveguide. Nine solitons, having a 1 ps width and a 5 ps spacing, corresponding to a 200 Gbps rate, are modelled as propagating in the waveguide. Group velocity dispersion, D, in the fiber is set at 2 ps/nm-km. Pump spacing is 20 km and pumping is uni-directional. The waveguide is optically transparent over the distance between pumping means. Solitons traveling in a lossless waveguide, in which there is no power excursion are charted in curve 8. The large intensity spike at 10 km is a soliton—soliton collision and marks the effective operating length of the system. When a small power excursion is introduced as shown in curve 9 the soliton collision occurs farther along the waveguide. The substantial power excursion shown by curve 12 has no incidence of soliton collision at a travel distance greater than 30 km. The periodic ripples, most noticeable in curve 10, are the soliton width fluctuations due to the power excursion. Note that at the highest power excursion shown, that of curve 10, the soliton begins to lose integrity, see, for example, intensity spike 16, after about 25 km of travel. At a power excursion lower than that of curve 12, a soliton collision occurs at about 30 km. Thus, the optimum power excursion lies between curves 12 and 10, a range of about 3 dB to 5.2 dB.

Figure 2B:
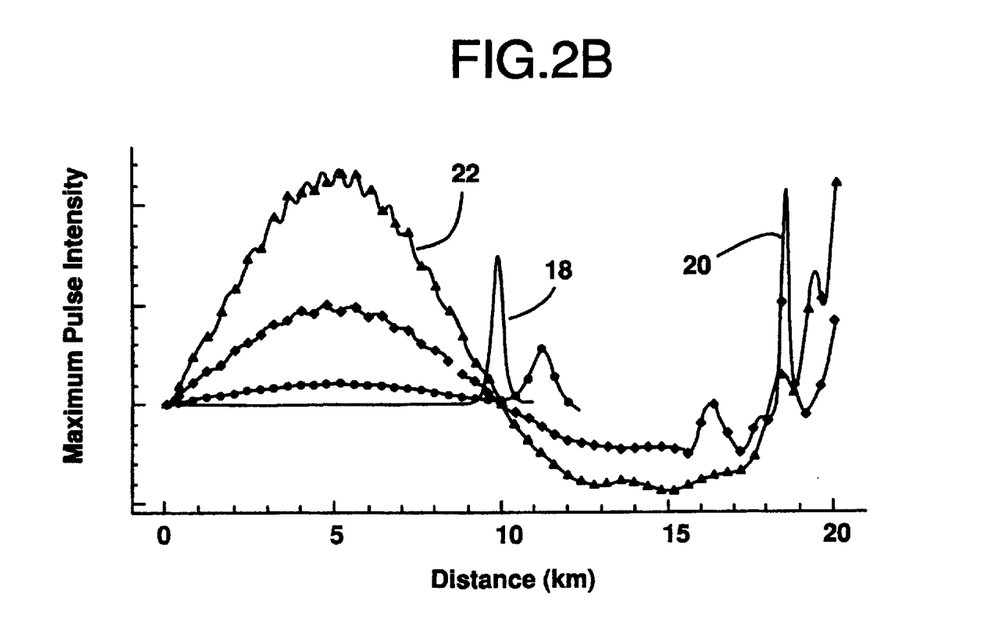
FIG. 2b is a chart of soliton maximum pulse intensity vs. distance for bi-directional pumping.

As a comparison case, FIG. 2b is a chart of soliton pulses propagated in a waveguide under the same conditions as stated for FIG. 2a except that the pumping is bi-directional. As before, the lossless case illustrated by curve 18 shows a soliton collision after about 10 km of travel in the waveguide. However in this case the higher power excursion curves, exemplified by curve 22, do not show enhanced soliton integrity at distances beyond 10 km. The intensity curve begins to show large oscillations after about 19 km of travel. Likewise, at the lower power excursion shown, soliton breakup is evidenced by intensity spike 20 after about 18 km. Comparing FIGS. 2a and 2b, it becomes clear that uni-directional pumping provides for soliton integrity over longer lengths than does bi-directional pumping.

This result is counter-intuitive because bi-directional pumping allows better control of the gain over length of the distributed waveguide amplifier. An explanation of the enhanced performance of the uni-directional pumped case is as follows. The higher gain near the launch end of the waveguide adiabatically, i.e., slowly, compresses the soliton pulses. That is, the intensity dependent self phase modulation is greater near the launch end of the waveguide. The part of the self phase modulation not balanced by the linear (group velocity) dispersion, D, serves to narrow the time width of the soliton pulses. The result is that the solitons are more widely spaced in the launch end of the distributed waveguide fiber amplifier and thus do not interact as strongly. Soliton—soliton interaction induced timing jitter is smaller and collisions do not occur due to the wider pulse spacing in time. Although, this explanation is believed to be correct, the invention is not limited by the explanation and does not depend upon its correctness.

Figure 4A:
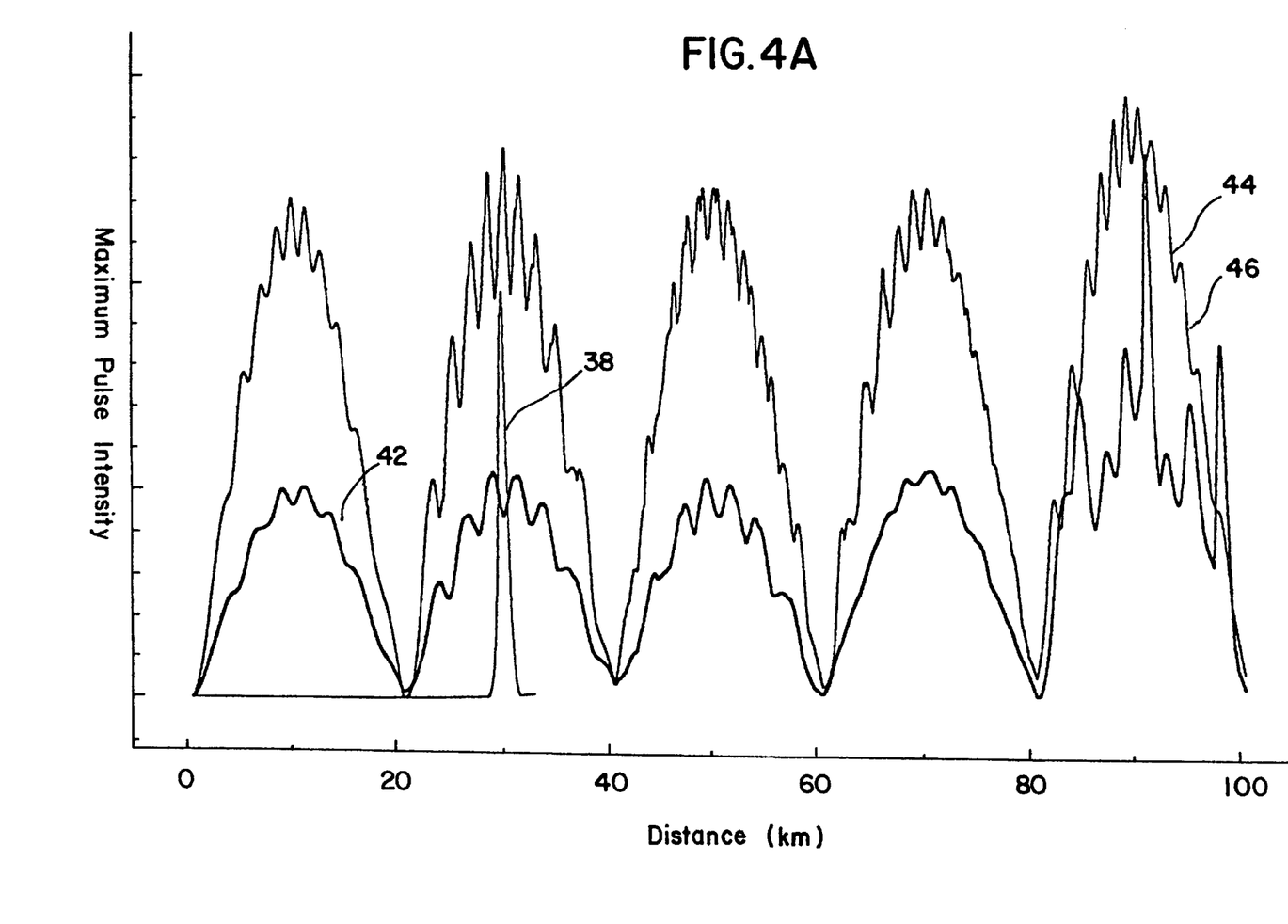
FIG. 4a is a chart of soliton maximum pulse intensity vs. distance for uni-directional pumping.

A second simulation is shown in FIG. 4a. The parameters used in the model are identical to those of the previous example except that the total waveguide dispersion, D, is taken to be 0.67 ps/nm-km. In the lossless case, a soliton collision occurs at about 30 km as shown by the intensity spike 38. A lower power excursion of the solitons is shown as curve 42. The soliton maximum intensity shows the expected oscillations over distance as before. The soliton integrity is maintained to about 80 km of travel in the waveguide. The intensity spikes which are seen at 85 km to 100 km are strong solitonsoliton interactions. Intensity spike 46 of curve 42 is a soliton—soliton collision.

Curve 40 charts the maximum pulse intensity vs. distance for a higher power excursion of the solitons. The oscillations due to changing soliton intensity are much larger than for curve 42 as expected. However, no soliton—soliton collisions occur at travel distances in the waveguide of 100 km. Here again, the best tradeoff of soliton oscillations for increased collisionless travel occurs at power excursions between those of curves 40 and 42. This observation can be seen more clearly in FIG. 4b where the intensity of the soliton pulse is charted vs. time after a travel distance of 90 km in the waveguide. At a power excursion of about 5.2 dB, curve 48 shows the original nine soliton pulses maintaining their time spacing and undergoing oscillations which are expected to yield an acceptable signal to noise ratio.

Figure 4B:
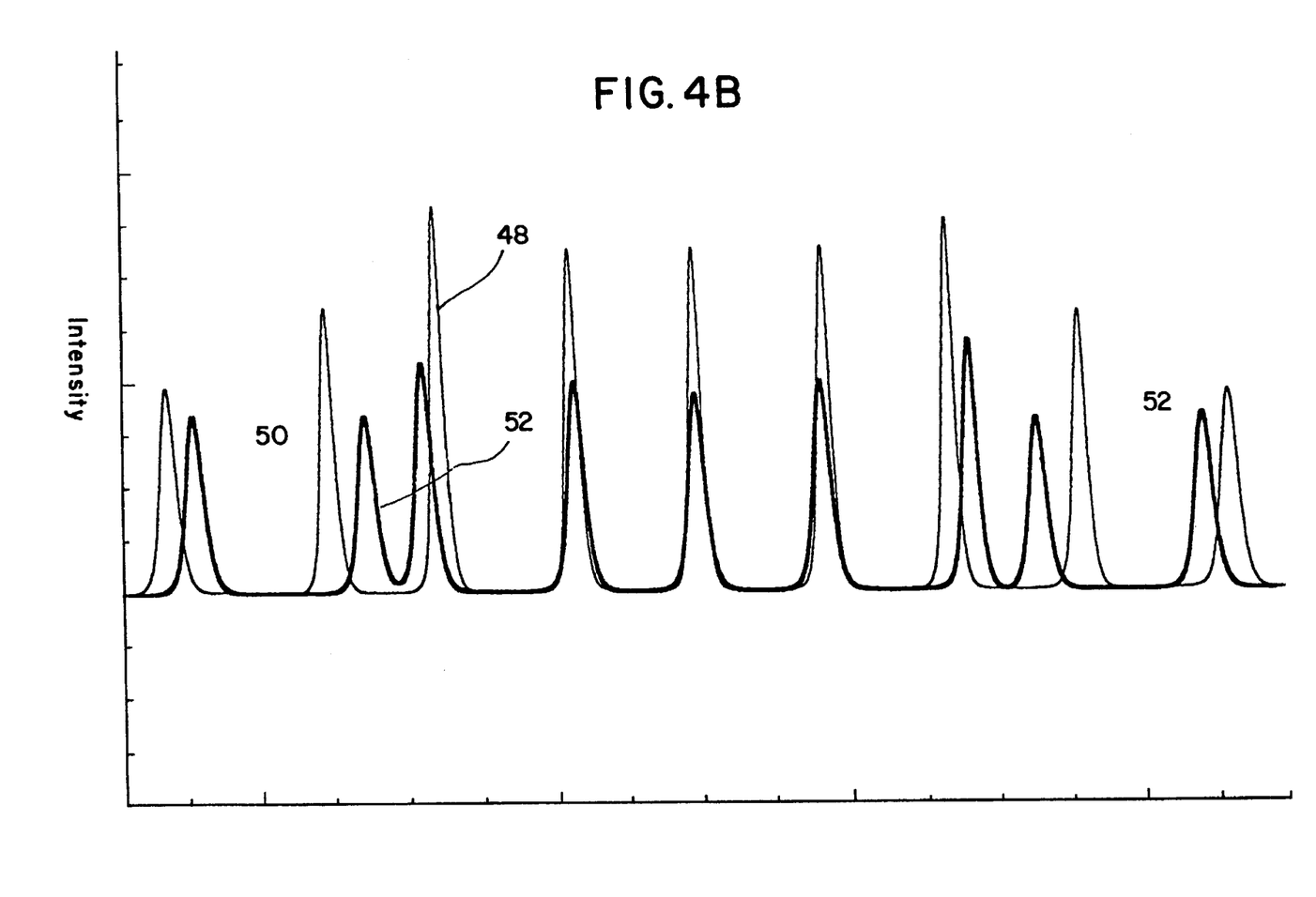
FIG. 4b shows the change in two soliton pulse groups over time from FIG. 4a after 90 km of travel in the waveguide.

While the oscillations in curve 50 are smaller, because the power excursion is only 3 dB, strong soliton—soliton interactions have dramatically altered the time spacing as can be seen at time locations 52. The higher power excursion thus provides for the transmission of error free soliton signals over greater waveguide lengths. This result teaches away from the art cited above.

Figure 3A:
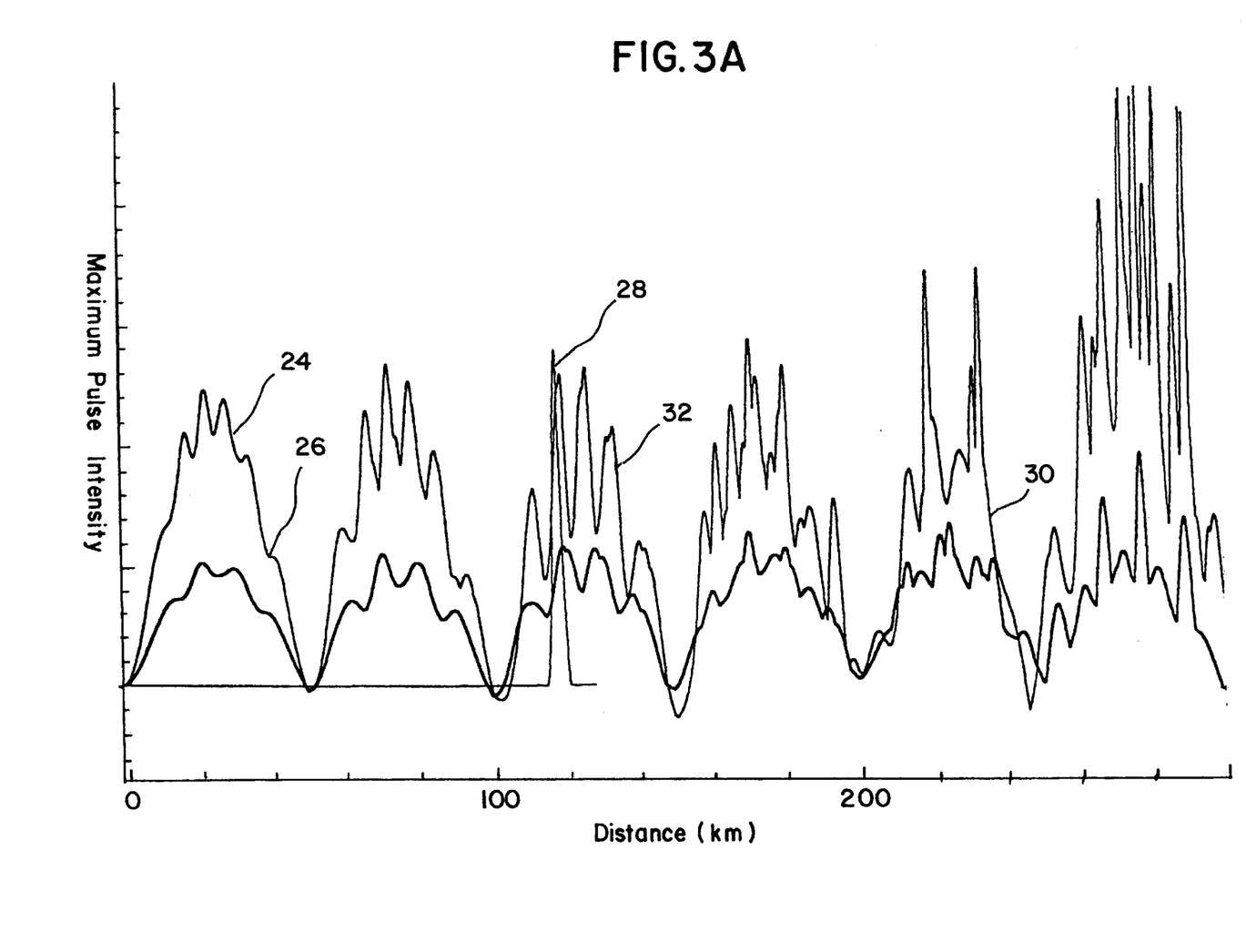
FIG. 3a is a chart of soliton maximum pulse intensity vs. distance for uni-directional pumping.

A third example serves to show the interaction of soliton power excursion with pump spacing and soliton pulse width. In FIG. 3a, the soliton pulse width is 2 ps and the pump spacing is 50 km. The total dispersion, D, of the waveguide is set at 0.67 ps/nm-km. The intensity spike 28 shows the lossless case experiences a soliton—soliton collision at about 120 km. The maximum pulse intensity curves vs. soliton travel distance, 26 and 24, again show larger oscillations for the case of higher power excursion 24. The side structure of curve 24 begins to distort the time spacing of the solitons at a travel distance of about 180 km. The structure apparent in the lower power excursion curve 26 does not begin to introduce data errors until travel distances well in excess of 250 km. Thus, for broader soliton pulses and wider pump spacing, the lower power excursion provides for longer distance error free transmission.

Figure 3B:
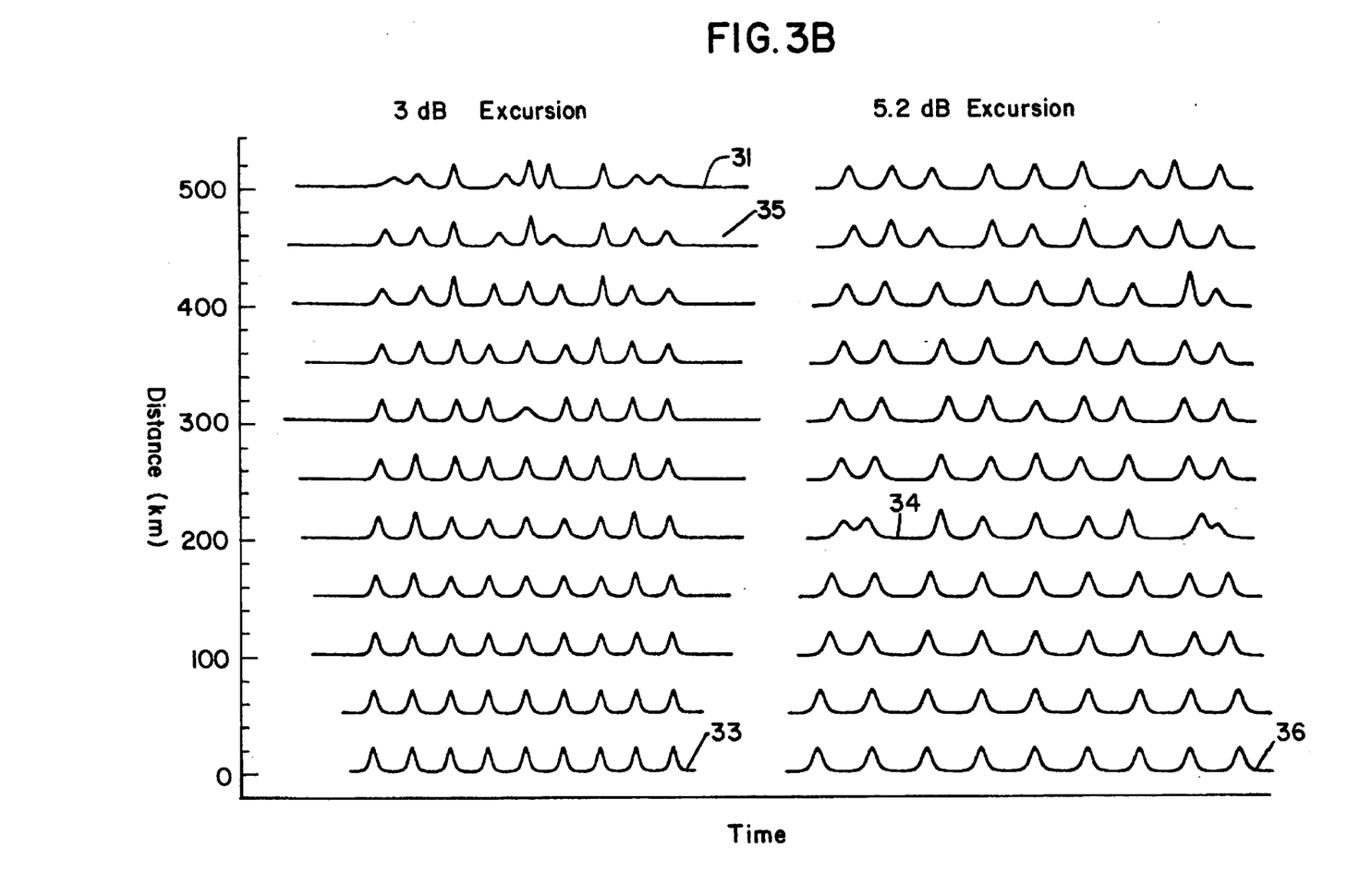
FIG. 3b shows the temporal change in two soliton pulse groups from FIG. 3a at particular distances in the waveguide.

The time evolution of the soliton pulses at selected distances along the waveguide is shown in FIG. 3b. The initial pulse spacing for each power excursion is shown as a series of soliton pulses 33, for the lower excursion, and 36, for the higher excursion. Note the timing errors which occur for the 5.2 dB power excursion at 200 km, in pulse train 34. In contrast, errors do not occur in for the case of the 3 dB power excursion until a travel distance greater than 400 km, as shown by pulse trains 35 and 31.

Figure 5:
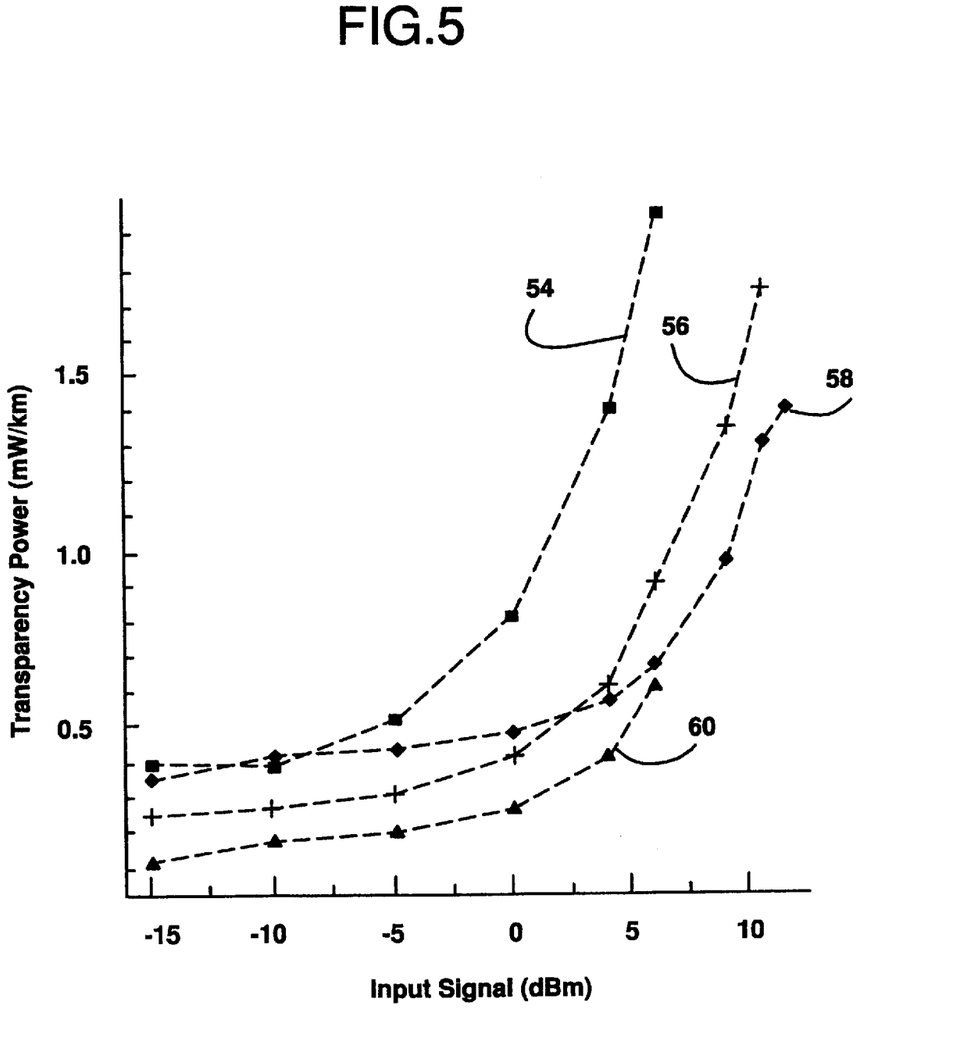
FIG. 5 is a chart of power required for fiber transparency vs. input signal power.

The power per kilometer required to reach waveguide transparency versus input signal power is shown in FIG. 5. Here curve 54 relates to a waveguide length of 49 km, curve 56 to a length of 55 km, curve 58 to a length of 50 km, and curve 60 to a fiber length of 154 km. The chart shows that required pump power for the regions of operations of typical soliton systems is achievable, even though the soliton input powers are usually above 0 dBm, where the curves steepen sharply. For example, the 154 km link operating at an input signal power of about 5 dB and having an $Er^{+3}$ concentration in the range of 20 to 200 ppb, requires a total pump power of about 60 mW, which is within the capability of present technology.

Thus, the subject invention provides a distributed optical amplifier for use with soliton transmission, which reduces the effects of soliton—soliton interaction by introducing an optimum excursion in the soliton intensity. An optimum operating regime is found wherein both the pulse intensity oscillations and the soliton—soliton interactions are kept in control.

Although particular embodiments of the invention have been disclosed and described hereinabove, the invention is nonetheless limited only by the following claims.

I claim:

1. A distributed erbium doped optical waveguide fiber amplifier, comprising:

an optical waveguide fiber, having a length, a net positive total dispersion, D, and a core region in contact with a surrounding clad layer, said core region containing erbium, having a ground state and distributed along the length of said waveguide fiber;

optical pumping means to provide pump light to excite erbium to an energy state above the ground state; and, coupling means for injecting pump light and soliton pulses into said waveguide fiber;

wherein, said distributed waveguide fiber amplifier produces an excursion in the power maximum of each soliton in the range of about +3.0 dB to +5.2 dB, relative to a reference fundamental soliton power having an order number of one in normalized units, at which self phase modulation is balanced with group velocity dispersion, D.

2. The optical waveguide amplifier of claim 1 wherein said erbium is distributed substantially uniformly along said optical waveguide fiber and the $Er^{+3}$ concentration is in the range of about 20 ppb to 200 ppb.

3. The optical waveguide amplifier of claim 2 wherein the pump light has a power level selected to provide for optical transparency of the length of said waveguide fiber.

4. The optical waveguide amplifier of claim 1 wherein the pump light propagates unidirectionally in said waveguide fiber.

5. An optical waveguide telecommunications system, comprising:

at least one erbium doped optical waveguide fiber, the erbium having a ground energy state, the waveguide fiber having a length, a net positive total dispersion, D, and a core region in contact with a surrounding clad layer, said core region containing said erbium, distributed along the length of said waveguide;

optical pumping means, having a pre-selected input power, coupled to said erbium doped waveguide to excite the erbium to an energy state above the ground state; and, means for generating a plurality of solitons to propagate in said erbium doped waveguide;

wherein, the excursion in the power maximum of each soliton is in the range of about +3.0 dB to +5.2 dB, relative to a reference fundamental soliton power having an order number of one in normalized units, at which self phase modulation is balanced with group velocity dispersion, D.

6. The optical waveguide telecommunication system of claim 5 wherein said optical pumping means are spaced apart along the waveguide fiber length and the pre-selected power of said optical pumping means provides for optical transparency of the waveguide length between neighboring pumping means.

7. The optical wavegiuide telecommunication system of claim 6 wherein light from said pumping means propagates unidirectionally in said waveguide fiber.

8. The optical waveguide telecommunication system of claim 7 wherein the spacing between said optical pumping means is in the range of about 20 km to 90 km.

9. The optical waveguide telecommunication system of claim 5 wherein said soliton pulses have a spacing in time which is no greater than about 5 times the time width of the soliton.

10. The optical waveguide telecommunication system of claim 9 wherein said soliton time width is about 1 ps.

11. The optical waveguide telecommunication system of claim 10 wherein the bit error rate is no greater than about $10^{-9}$ for a pumping means spacing of 90 km.

12. The optical waveguide telecommunication system of claim 9 wherein the system length traversed by a soliton before soliton—soliton interactions cause a transmission error rate greater than about $10^{-9}$ is in the range of about 30 km to 500 km.

* * * * *